(12) United States Patent
Matsubara et al.

(10) Patent No.: US 8,380,023 B2
(45) Date of Patent: Feb. 19, 2013

(54) WAVEGUIDE-TYPE OPTICAL CIRCUIT

(75) Inventors: Noritaka Matsubara, Tokyo (JP); Kazutaka Nara, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 256 days.

(21) Appl. No.: 12/836,145

(22) Filed: Jul. 14, 2010

(65) Prior Publication Data
US 2012/0014636 A1 Jan. 19, 2012

(51) Int. Cl.
G02B 6/12 (2006.01)
G02F 1/295 (2006.01)

(52) U.S. Cl. .......... 385/14; 385/8; 385/9; 385/30; 385/42

(58) Field of Classification Search .......... 385/1–14, 385/30, 41–42
See application file for complete search history.

(56) References Cited

U.S. PATENT DOCUMENTS

| | | | |
|---|---|---|---|
| 6,950,581 B2* | 9/2005 | Bandyopadhyay | 385/42 |
| 7,389,033 B2 | 6/2008 | Hashizume et al. | |
| 7,421,156 B1* | 9/2008 | Liu et al. | 385/14 |
| 7,577,324 B2* | 8/2009 | Liu et al. | 385/14 |
| 2005/0008282 A1* | 1/2005 | Sakurai et al. | 385/14 |
| 2011/0085761 A1 | 4/2011 | Nara et al. | |

FOREIGN PATENT DOCUMENTS

| | | |
|---|---|---|
| JP | 63-49708 A | 3/1988 |
| JP | 3-265802 A | 11/1991 |
| JP | 5-93813 A | 4/1993 |
| JP | 5-323136 A | 12/1993 |
| JP | 7-56032 A | 3/1995 |
| JP | 2004-29139 A | 1/2004 |
| WO | WO 9410592 A1 * | 5/1994 |
| WO | WO 2006/075702 A1 | 7/2006 |

OTHER PUBLICATIONS

U.S. Appl. No. 13/409,556, filed Mar. 1, 2012, Inoue, et al.
Japanese Office Action issued May 29, 2012 in Patent Application No. 2009-008205 with English Translation.

* cited by examiner

*Primary Examiner* — Daniel Petkovsek
(74) *Attorney, Agent, or Firm* — Oblon, Spivak, McClelland, Maier & Neustadt, L.L.P.

(57) ABSTRACT

A waveguide-type optical circuit comprises an optical coupler being an optical branch coupler constructed from waveguide cores which are closely arranged to each other, and dummy patterns that lay along sides of the waveguide cores in the optical coupler for preventing optical major axes of the waveguide cores from inclining.

10 Claims, 6 Drawing Sheets

WAVEGUIDE-TYPE OPTICAL CIRCUIT

BACKGROUND OF THE INVENTION

1. Field of the Invention

The present invention relates to a waveguide-type optical circuit provided with an optical coupler such as a directional coupler.

2. Description of the Related Art

In a conventional Directional Coupler (DC), as described in Paragraph 0024 in International Publication Pamphlet No. WO 2006/075702, a region (gap portion) sandwiched between two waveguide cores at a close portion of waveguides is supplied with a less amount of glass particles during formation of upper cladding because waveguide patterns are close to each other, and the density of the glass particles therefore becomes sparse. Meanwhile, a region (non-gap portion) that is not sandwiched between the two waveguide cores is sufficiently supplied with the glass particles. Therefore, the densities of the glass particles in the gap portion and the non-gap portion become different from each other. After the upper cladding is formed, stresses to incline the two waveguide cores toward inside the gap portion occur in the two waveguide cores. Consequently, optical major axes of the two waveguide cores become inclined while polarization mode coupling occurs.

Therefore, a Polarization Dependent Loss (PDL) caused by the polarization mode coupling in DC occurs in the DC or in a Mach-Zehnder Interferometer (MZI) circuit that uses the DC. An optical branch coupler such as the DC includes a Planar Lightwave Circuit (PLC)-type optical coupler such as a PLC-type 2×2 coupler. The MZI circuit using the DC includes a PLC-type variable optical attenuator. However, there is a problem in that large PDL prevents the PLC-type optical coupler and the PLC-type variable optical attenuator or the like from becoming widespread. In addition, in optical branch couplers having a structure with closely positioned waveguide cores such as a Multi-Mode Interference (MMI) coupler and a Y branch, a phenomenon similar to the DC occurs, and thus, PDL caused by the polarization mode coupling occurs also in the MZI circuit that uses the optical branch coupler such as the MMI coupler and the Y branch.

SUMMARY OF THE INVENTION

In accordance with one aspect of the present invention, a waveguide-type optical circuit comprises an optical coupler being an optical branch coupler constructed from waveguide cores which are closely arranged each other, and dummy patterns that lay along sides of the waveguide cores in the optical coupler for preventing optical major axes of the waveguide cores from inclining.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of a waveguide-type optical circuit according to the present invention will be explained below in detail below with reference to FIG. 1 to FIG. 12. It should be noted that the present invention is not limited to these embodiments, and thus, various changes may be made without departing from the scope of the present invention. In the description of the embodiments, the same reference numerals are assigned to the same portions and parameters, and redundant explanation of such portions and parameters will be omitted.

First Embodiment

A schematic configuration of a waveguide-type optical circuit according to a first embodiment of the present invention will be explained below with reference to FIG. 1 to FIG. 3.

Figure 1:
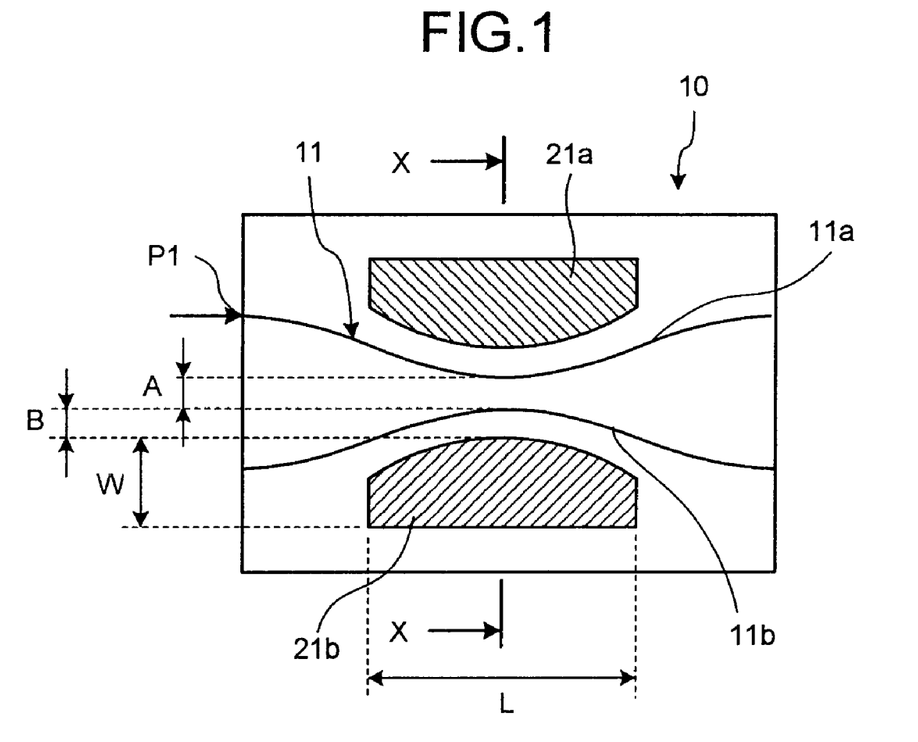
FIG. 1 is a plan view of a schematic configuration of a waveguide-type optical circuit according to a first embodiment of the present invention.
Figure 2:
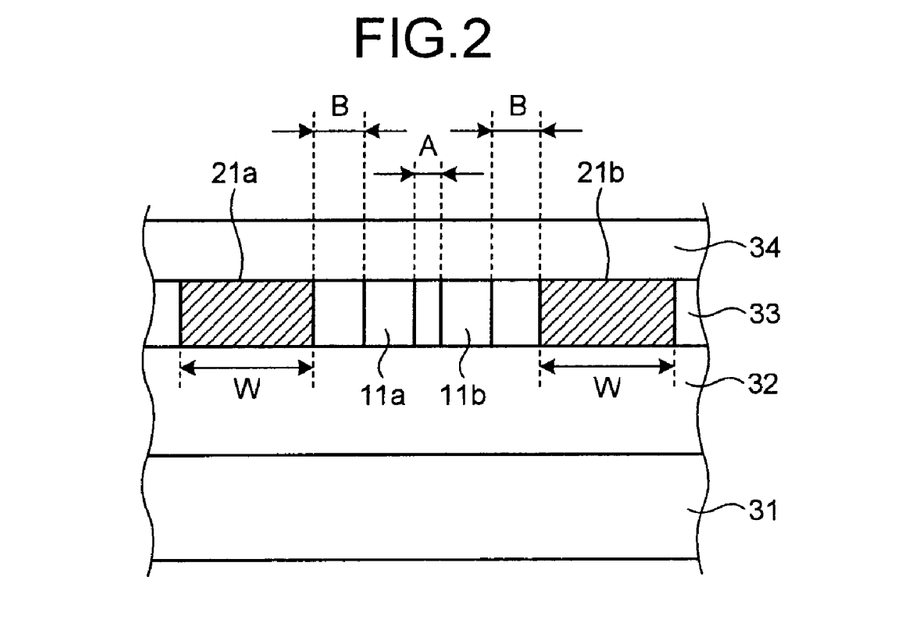
FIG. 2 is a cross-sectional view taken along line X-X in FIG. 1.
Figure 3:
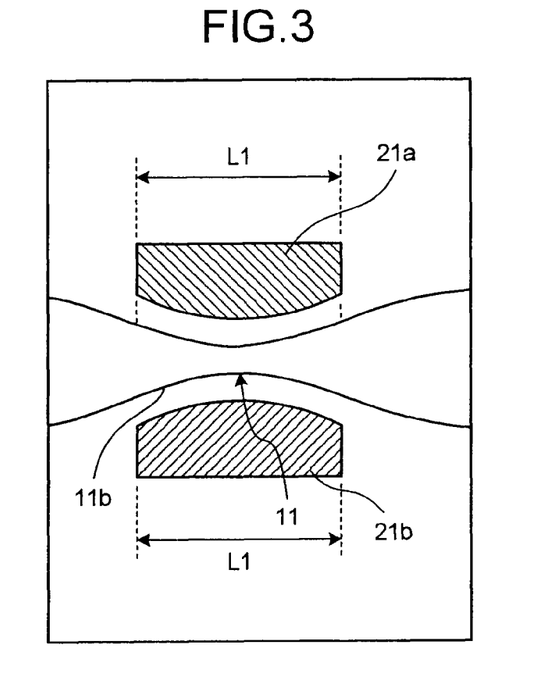
FIG. 3 is a diagram for explaining a length of a dummy pattern in FIG. 1.

FIG. 1 represents a schematic configuration of the waveguide-type optical circuit according to the first embodiment of the present invention, FIG. 2 is a cross-sectional view taken along line X-X in FIG. 1, and FIG. 3 is a diagram for explaining a length of a dummy pattern in FIG. 1.

A waveguide-type optical circuit 10 according to the first embodiment shown in FIG. 1 includes one directional coupler 11. The directional coupler 11 is an optical coupler (optical branch coupler) configured so that waveguide cores 11a and 11b are arranged closely facing to each other. Dummy patterns 21a and 21b are formed along both sides of the waveguide cores 11a and 11b so as to prevent optical major axes of the waveguide cores 11a and 11b from inclining. More specifically, the dummy patterns 21a and 21b are formed on both sides of the waveguide cores 11a and 11b so as to sandwich a close portion of the waveguide cores 11a and 11b therebetween. As shown in FIG. 2, the waveguide cores 11a and 11b and the dummy patterns 21a and 21b are surrounded by a lower cladding layer 32, a side cladding layer 33, and an upper cladding layer 34.

For the dummy patterns 21a and 21b, it is desirable to use a material whose birefringence applied thereto becomes $1 \times 10^{-4}$ or more in order to enhance polarization retention, and, for example, the same material as that of the waveguide cores 11a and 11b can be used.

Each length L of the dummy patterns 21a and 21b (see FIG. 1) may be equal to or greater than a length L1 (see FIG. 3) of a coupling portion contributing to coupling of the directional coupler 11. Here, the coupling portion indicates a region in which a coupling efficiency is greater than 0%.

As shown in FIG. 1 and FIG. 2, a gap B between the dummy pattern 21a and the waveguide core 11a, and a gap B between the dummy pattern 21b and the waveguide core 11b may be equal to or greater than a gap size A between the waveguide cores 11a and 11b at the close portion of the directional coupler 11.

As for the gap B, in order to reduce the PDL caused by the polarization mode coupling in the directional coupler 11, it is best to set the gap B to be equal to the gap size A. Furthermore, if the dummy patterns 21a and 21b are made too close to the waveguide cores 11a and 11b of the directional coupler 11, small optical coupling will occur between the dummy patterns 21a and 21b and the waveguide cores 11a and 11b, respectively. Therefore, by setting the gap B to be larger than the gap size A×1.0, it is possible to prevent occurrence of small optical coupling and reduce the PDL caused by the polarization mode coupling while suppressing the loss.

Each minimum width W (see FIGS. 1 and 2) of the dummy patterns 21a and 21b may be such width that a fundamental mode (a single mode in which light can be guided through each of the waveguide cores 11a and 11b) of a propagation light in the waveguide of the directional coupler 11 is not be coupled to the dummy pattern, or wider than that.

Here, "the fundamental mode of the propagation light in the waveguide is not coupled thereto" means that a coupling efficiency is approximately 0%.

If the width W of each of the dummy patterns 21a and 21b is a width that the fundamental mode of a propagation light in the waveguide of the directional coupler 11 is coupled to the dummy pattern, then the light in the fundamental mode guided along each of the waveguide cores 11a and 11b of the directional coupler 11 is coupled to the dummy pattern 21a/21b, while the light is not coupled to an output-side waveguide but becomes a cladding-mode light, which results in an excessive loss. If the width W of each of the dummy patterns 21a and 21b is set to the width that the fundamental mode of the propagation light in the waveguide is not coupled to the dummy pattern 21a/21b or wider than that, the light in the fundamental mode being guided along each of the waveguide cores 11a and 11b will not be coupled to the dummy pattern 21a/21b, since a propagation constant is different between the waveguide cores 11a and 11b and the dummy patterns 21 will, whereby the excessive loss does not occur. This allows suppression of the excessive loss.

In the waveguide-type optical circuit 10, at least one of the length L of the dummy pattern 21a/21b, the gap B and the width W of each of the dummy patterns 21a and 21b is preferably set so that an amount of polarization mode coupling in the directional coupler 11 becomes −25 dB or less.

Manufacturing Method in First Embodiment

A manufacturing method (the following processes (1) to (3)) of the waveguide-type optical circuit 10 configured in the above manner will be explained below with reference to FIG. 2.

(1) Using a Flame Hydrolysis Deposition (FHD) method, a silica material ($SiO_2$-base glass particles) that becomes a core layer (not shown) to form the lower cladding layer 32, the waveguide and the dummy patterns is deposited on a silicon (Si) substrate 31, and is heated so that the glass film is fused and becomes transparent.

(2) Thereafter, desired waveguide and dummy pattern is formed from the core layer using photolithography and reactive ion etching. Here, the waveguide cores 11a and 11b of the directional coupler 11 are formed, and the dummy patterns 21 and 21 are formed along the waveguide cores 11a and 11b. The dummy patterns 21 and 21 are formed with the same material as that of the waveguide cores 11a and 11b. By drawing the dummy patterns 21 and 21 on a photo mask on which a waveguide pattern used for the photolithography is drawn, both the waveguide cores 11a and 11b and the dummy patterns 21 and 21 can be formed simultaneously on the core layer without needing any additional manufacturing process.

(3) Thereafter, using the FHD method, a silica material ($SiO_2$-base glass particles) that becomes the side cladding layer 33 and the upper cladding layer 34 is deposited so that the waveguide cores 11a and 11b and the dummy patterns 21 and 21 are buried in the side cladding layer 33 and the upper cladding layer 34, and the silica material is heated at high temperature so that the glass film is fused and becomes transparent (is vitrified).

Figure 10:
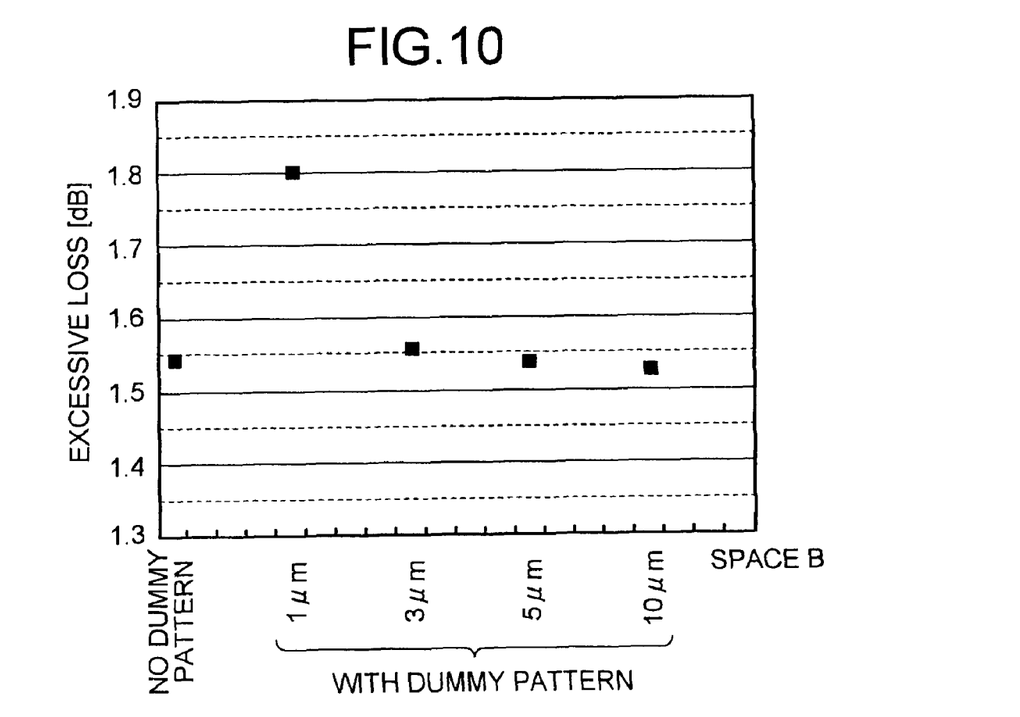
FIG. 10 is a graph representing excessive losses of the waveguide-type optical circuit shown in FIG. 7.

The waveguide-type optical circuit 10 shown in FIG. 10 is manufactured in this manner. Incidentally, in the process (3), when the glass particles for the side cladding layer 33 and the upper cladding layer 34 are deposited and vitrified to form the side cladding layer 33 and the upper cladding layer 34, because the gap B between the waveguide cores 11a and 11b is as narrow as a few micrometers, the glass particles do not smoothly enter between the waveguide cores 11a and 11b. Therefore, the density of the glass particles between the waveguide cores 11a and 11b becomes sparse.

However, in the waveguide-type optical circuit 10 according to the present embodiment, the dummy patterns 21a and 21b are provided on both sides of the directional coupler 11, and the gaps B between the dummy patterns 21a and 21b and the waveguide cores 11a and 11b are set to be equal to or greater than the gap size A. Therefore, although the density of the glass particles between the waveguide cores 11a and 11b becomes sparse, the density of the glass particles around the cores also becomes sparse, which will prevent such inconvenience that the respective waveguide cores 11a and 11b incline inwardly.

That is, the density of the glass particles between the waveguide cores 11a and 11b is close to each density of the glass particles between the dummy patterns 21a and 21b and the waveguide cores. Therefore, occurrence of stresses that make both the waveguide cores 11a and 11b incline inwardly can be suppressed. Therefore, the inclination of the optical major axes of both the waveguide cores 11a and 11b can be prevented, occurrence of polarization cross talk light can be controlled in the directional coupler 11, and the polarization mode coupling can be suppressed. This allows reduction of the PDL caused by the polarization mode coupling.

Waveguide-Type Optical Circuit with No Dummy Pattern

Figure 5:
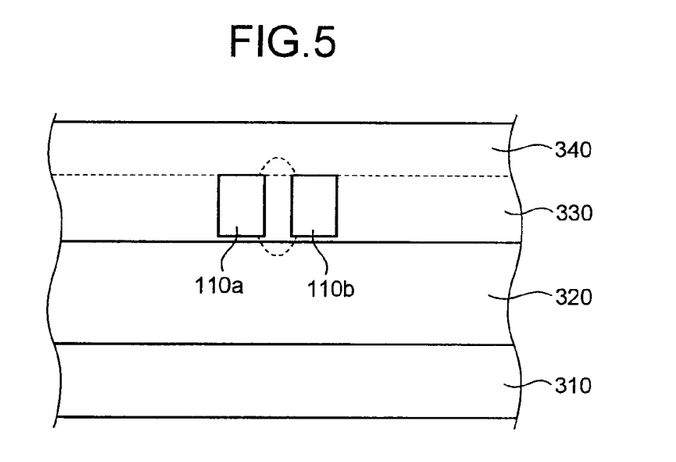
FIG. 5 is a cross-sectional view taken along line Y-Y in FIG. 4.
Figure 6A:
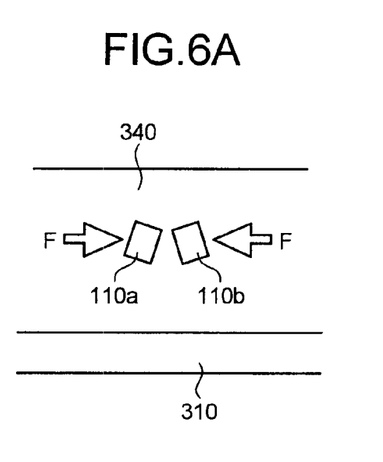
FIGS. 6A and 6B are cross-sectional views, similar to FIG. 5, which explain how stresses are applied to cores and the cores are thereby inclined.
Figure 6B:
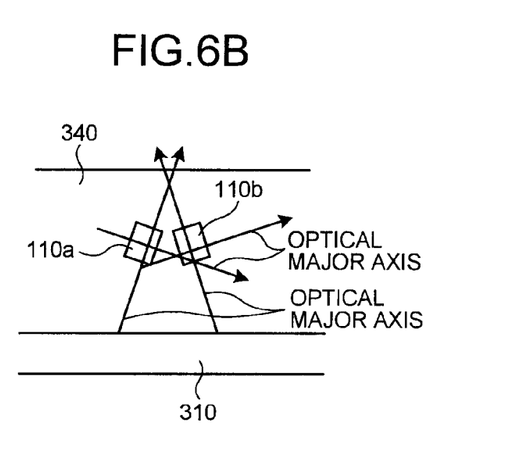

Next, as a comparison example of the first embodiment, a manufacturing method (the following processes (1a) to (3a)) of a conventional waveguide-type optical circuit with no dummy pattern will be explained based on FIG. 4 to FIG. 6.

Figure 4:
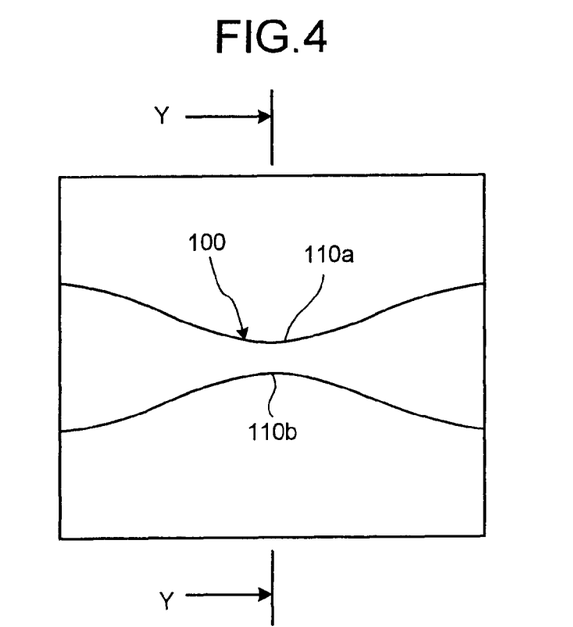
FIG. 4 is a plan view of a conventional waveguide-type optical circuit with no dummy pattern.

FIG. 4 represents a conventional waveguide-type optical circuit provided with a directional coupler 110. The conventional waveguide-type optical circuit is manufactured in the following manner. FIG. 5 and FIG. 6 are cross-sectional views taken along line Y-Y in FIG. 4. Particularly, FIGS. 6A and 6B are diagrams for explaining how stresses are applied to the cores and thereby the cores incline.

(1a) Using the FHD method, a silica material ($SiO_2$-base glass particles) that becomes a core layer (not shown) to form a lower cladding layer 320 and a waveguide is deposited on a silicon (Si) substrate 310 (see FIG. 5), and heated so that the glass film is fused and becomes transparent.

(2a) Thereafter, a desired waveguide is formed from the core layer using photolithography and reactive ion etching. Here, waveguides such as waveguide cores 110a and 110b of the directional coupler 110 are formed.

(3a) Thereafter, using the FHD method, a silica material that becomes a side cladding layer 330 and an upper cladding layer 340 is deposited so that the waveguide cores 110a and 110b are buried in the side cladding layer 330 and the upper cladding layer 340, and the silica material is heated at high temperature so that the glass film is fused and becomes transparent (is vitrified).

The waveguide-type optical circuit including the directional coupler 110 is manufactured in this manner.

Incidentally, in the process (3a), when the glass particles for the side cladding layer 330 and the upper cladding layer 340 are deposited and vitrified to form the side cladding layer 330 and the upper cladding layer 340, because a gap between the waveguide cores 110a and 110b is as narrow as one micrometer, the glass particles do not smoothly enter the gap between the waveguide cores 110a and 110b. Therefore, the density of the glass particles between the waveguide cores 110a and 110b becomes sparse. At this time, forces F (see FIG. 6A) to make both the waveguide cores 110a and 110b incline will act on the waveguide cores 110a and 100b whereby the vitrification is processed. With these actions, in a very extreme case, both the waveguide cores 110a and 110b will incline inwardly in their slightly deformed state, and the optical major axes of the waveguide cores 110a and 110b will incline (see FIG. 6B).

In such condition as in the comparison example, coupling between different polarized lights (polarization mode coupling) occurs, and polarization dependency of an optical circuit becomes large, which originating from the PDL caused by the polarization mode coupling to occur.

According to the first embodiment as configured in the above manner, the following effects can be obtained.

(1) The dummy patterns 21a and 21b are formed along both sides of the waveguide cores 11a and 11b of the directional coupler 11, and a structure sandwiched between the dummy pattern 21a and the waveguide core 11a or between the dummy pattern 21b and the waveguide core 11b is provided in a non-gap portion (a region not sandwiched between two waveguide cores). Thereby, the density of the glass particles in the non-gap portion can be made sparse, similarly to the density of the glass particles between the two waveguide cores 11a and 11b (gap portion) becoming sparse. Therefore, formation of the dummy patterns 21a and 21b enables the density of the glass particles in the non-gap portion to become close to the density of the glass particles in the gap portion. At this time, because the densities of the glass particles in both sides (non-gap portion and gap portion) of the waveguide cores 11a and 11b are close to each other, it is possible to suppress occurrence of stresses that make the waveguide cores 11a and 11b incline toward inside the gap, while such stresses are caused by a difference of the densities of the glass particles in an upper-cladding layer forming process. That is, by arranging the dummy patterns 21a and 21b, it is possible to suppress the polarization mode coupling in which optical major axes of the waveguide cores 11a and 11b incline due to the stresses and different polarized lights are coupled in the directional coupler 11, and to reduce the PDL that can be induced by the polarization mode coupling.

(2) Each length L of the dummy patterns 21a and 21b is set to be equal to or greater than the length L1 of a coupling portion contributing to coupling of the directional coupler 11. This prevents the optical major axes of the waveguide cores 11a and 11b from inclining in the whole region (length L1 of the coupling portion) contributing to the coupling, whereby polarization mode coupling can be suppressed, and the effect that PDL that can be caused by the polarization mode coupling can be reduced can become more apparent. The PDL that can be caused by the polarization mode coupling can be reduced more effectively.

(3) The gap B is set to be equal to or greater than the gap size A. Thus, because the density of the glass particles becomes sparse because of the gap size A in a gap structure of about a few micrometers, by making the gap B and the gap size A match, the densities of the glass particles on both sides (non-gap portion and gap portion) of the waveguide cores 11a and 11b can be matched, and occurrence of stresses can be prevented most effectively. Thus, the inclination of the optical major axes of the both waveguide cores 11a and 11b can be prevented, the polarization mode coupling in the directional coupler 11 can be suppressed, and the PDL caused by the polarization mode coupling can be reduced. It is best that the gap B has the same size as the gap size A. However, if the dummy patterns 21a and 21b are made too close to the waveguide cores 11a and 11b, small optical coupling may occur between the dummy pattern 21a and the waveguide core 11a and between the dummy pattern 21b and the waveguide core 11b. Therefore, by making the gap B equal to or greater than the gap size A, occurrence of the small optical coupling can be prevented, thus suppressing the loss. Furthermore, by arranging the dummy patterns 21a/21b, it is possible to prevent the polarization mode coupling in which the optical major axes of the both waveguide cores 11a and 11b incline due to the stresses and polarized lights are coupled in the directional coupler 11, and to reduce the PDL that can be caused by the polarization mode coupling. In this manner, the loss can be minimized and the PDL caused by the polarization mode coupling can be reduced.

(4) The width W of each of the dummy patterns 21a and 21b is set to such width that the fundamental mode of the propagation light along the waveguide in the directional coupler 11 will not be coupled to the dummy pattern 21a/21b or to a width greater than that. If the width W of each of the dummy patterns 21a and 21b is such width that the fundamental mode of the propagation light along the waveguide in the directional coupler 11 will be coupled to the dummy pattern 21a/21b, the light in the fundamental mode for being guided along the waveguide core of the directional coupler 11 will be coupled to the dummy pattern 21a/21b, and the light will not therefore be coupled to the output-side waveguide but become a cladding-mode light, which causes an excessive loss. If the width W of each of the dummy patterns 21a and 21b is set to the width that the fundamental mode of the propagation light along the waveguide will not be coupled to the dummy pattern 21a/21b or to a width wider than that, a propagation constant in the waveguide cores 11a and 11b will be different from that in the dummy patterns 21. As a result, the lights in the fundamental mode for being guided along the waveguide cores 11a and 11b will not be coupled to the dummy patterns 21a and 21b, respectively, and the excessive loss will not occur. This allows suppression of the excessive loss.

(5) At least one of the length L of the dummy pattern 21a/21b, the gap B, and the width W of each of the dummy patterns 21a and 21b is set in a way that an amount of polarization mode coupling in the directional coupler 11 becomes −25 dB or less. Whereby, excessive loss can be minimized in the directional coupler 11, and the polarization mode coupling can be reduced to a sufficiently small value as −25 dB or less, allowing PDL reduction effect to be obtained.

(6) According to the above-described method of manufacturing the waveguide-type optical circuit 10, the method is nearly the same as the conventional method, while the waveguide-type optical circuit 10 can be manufactured without needing any additional particular manufacturing process.

Second Embodiment

Figure 7:
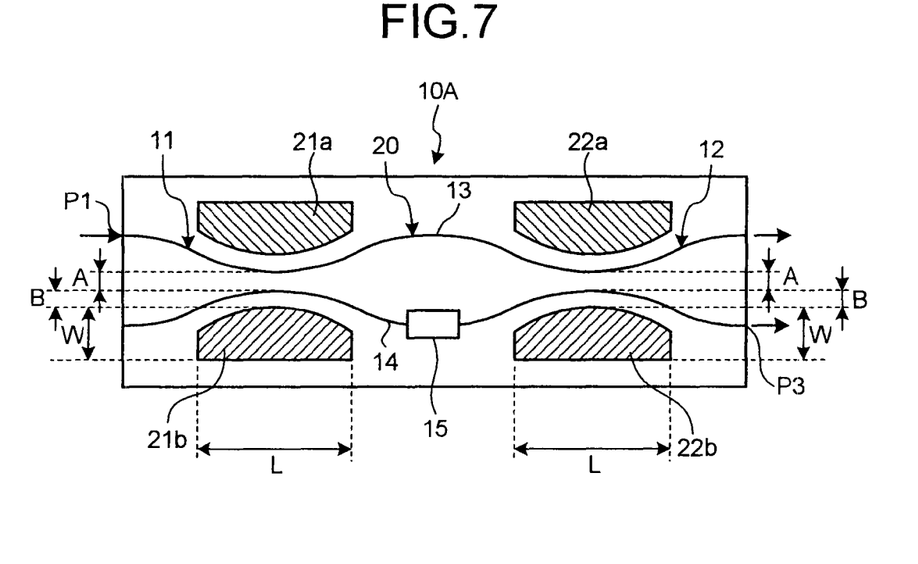
FIG. 7 is a plan view of a schematic configuration of a waveguide-type optical circuit according to a second embodiment of the present invention.

FIG. 7 represents a schematic configuration of a waveguide-type optical circuit 10A according to a second embodiment of the present invention.

The waveguide-type optical circuit according to the second embodiment shown in FIG. 7 is configured as a PLC-type variable optical attenuator (PLC-VOA) 10A.

The PLC-VOA 10A is provided with a Mach-Zehnder Interferometer (MZI) circuit 20 that includes two directional couplers 11 and 12, two arm waveguides 13 and 14 connected between the two directional couplers 11 and 12 respectively, and a thin film heater 15 disposed on the arm waveguide 14. Here, although the PLC-VOA configured as having one MZI circuit will be explained, the present invention is also applicable to PLC-VOA connected to multiple-stage MZI circuits for the present invention is to be applied to an optical coupler in the MZI circuit.

In the PLC-VOA 10A, the power is externally applied to the thin film heater 15 to heat the arm waveguide 14 so that an effective refractive index of the arm waveguide 14 can be changed through a thermo-optical effect according to an amount of heat generation. The change in the effective refractive index of the arm waveguide 14 corresponds to a change in an optical path length of a propagating signal light. More specifically, by changing the voltage applied to the thin film heater 15, a difference in the optical path length between the arm waveguides 13 and 14 can be set.

In the PLC-VOA 10A, the signal light incident from an input port P1 splits in the input-side directional coupler 11, the split lights independently propagate along the two arm waveguides 13 and 14, and are coupled again with a desired optical path length difference at the directional coupler 12, on the output side to be outputted from an output port P3. At this time, coupling efficiency of the MZI circuit 20 becomes a maximum (1) when the difference in the optical path length between the arm waveguides 13 and 14 is zero (0), and becomes a minimum (0) when the difference between the optical path lengths is equal to one half of the wavelength of the signal light. Furthermore, when the difference between the optical path lengths is any value between these values, the coupling efficiency continuously changes from 1 to 0. That is, by timely setting the difference between the optical path lengths, a desired coupling efficiency can be obtained, and the PLC-VOA can be operated as a variable optical attenuator.

In the PLC-VOA 10A, the dummy patterns 21a and 21b for preventing inclination of the optical major axes of the waveguide cores 11a and 11b are formed on both sides of the directional coupler 11, and dummy patterns 22a and 22b for preventing inclination of the optical major axes of waveguide cores 12a and 12b are also formed on both sides of the directional coupler 12. It should be noted that parameters such as a gap B, a gap size A, a length L of the dummy patterns 21a, 21b, 22a and 22b, and a width W of the dummy patterns 21a, 21b, 22a and 22b in the PLC-VOA 10A shown in FIG. 2 are the same as the parameters in the waveguide-type optical circuit 10 shown in FIG. 1. In the PLC-VOA 10A, it is preferable that at least one of the length L of the dummy patterns 21a, 21b, 22a and 22b, the gap B, and the width W of the dummy patterns 21a, 21b, 22a and 22b is set so that an amount of polarization mode coupling of the directional couplers 11 and 12 becomes −25 dB or less.

Manufacturing Method in Second Embodiment

A manufacturing method (the following processes (1) to (4)) of the PLC-VOA 10A configured in the above manner will be explained below based on the manufacturing method in the first embodiment and FIG. 7.

(1) Using the FHD method, a silica material ($SiO_2$-base glass particles) that becomes a core layer to form a lower cladding layer, waveguide cores, and dummy patterns is deposited on a silicon (Si) substrate, and heated so that the glass film is fused and becomes transparent.

(2) Thereafter, desired waveguides and dummy patterns are formed from the core layer using photolithography and reactive ion etching. Here, waveguides such as the waveguide cores 11a and 11b of the directional coupler 11, the two arm waveguides 13 and 14, and the waveguide cores 12a and 12b of the directional coupler 12 are formed, and the dummy patterns 21a, 21b, 22a and 22b are formed along the waveguide cores 11a, 11b and the waveguide cores 12a, and 12b, respectively. Here, by drawing the dummy patterns on a photo mask on which a waveguide pattern used for the photolithography is drawn, both the waveguides and the dummy patterns are formed simultaneously on the core layer without addition of any manufacturing process.

(3) Thereafter, using the FHD method, a silica material ($SiO_2$-base glass particles) that becomes a side cladding layer and an upper cladding layer is deposited so that the waveguide cores and the dummy patterns are buried in the side cladding layer and the upper cladding layer, and the silica material is heated at high temperature so that the glass film is fused and becomes transparent (is vitrified).

(4) Subsequently, a heater and a wiring electrode are formed on the upper cladding layer.

The PLC-VOA 10A is manufactured in this manner. Incidentally, in the process (3), when the glass particles for the side cladding layer and the upper cladding layer are deposited and vitrified to form the side cladding layer and the upper cladding layer, because the gap B between the waveguide cores 11a and 11b and the gap B between the waveguide cores 12a and 12b are as narrow as a few micrometers, the glass particles do not smoothly enter between the waveguide cores 11a and 11b and between the waveguide cores 12a and 12b. Therefore, the densities of the glass particles between the waveguide cores 11a and 11b and between the waveguide cores 12a and 12b become sparse, respectively.

However, in the PLC-VOA 10A according to the present embodiment, the dummy patterns 21a, 21b, 22a and 22b are provided on both sides of the directional couplers 11 and 12 respectively, and the gaps B between the dummy patterns 21a and 21b and the waveguide cores 11a and 11b and the gaps B between the dummy patterns 22a and 22b and the waveguide cores 12a and 12b are set to be equal to or greater than the gap size A, respectively. Therefore, although the densities of the glass particles between the waveguide cores 11a and 11b and between the waveguide cores 12a and 12b become sparse, the density of the glass particles around the cores also becomes sparse, which will prevent such inconvenience that the respective waveguide cores 11a and 11b and the waveguide cores 12a and 12b incline inwardly.

That is, each density of the glass particles between the waveguide cores 11a and 11b and between the waveguide cores 12a and 12b is close to each density of the glass particles between each of the dummy patterns 21a, 21b, 22a and 22b and the corresponding waveguide core. Therefore, occurrence of stresses that make both the waveguide cores 11a and 11b and the waveguide cores 12a and 12b incline inwardly can be suppressed. Therefore, the inclination of the optical major axes of the waveguide cores 11a and 11b and the waveguide cores 12a and 12b can be prevented, and the polarization mode coupling where different polarized lights are coupled in the directional couplers 11 and 12 can be suppressed. This allows reduction of PDL caused by the polarization mode coupling.

According to the second embodiment as configured in the above manner, the following effects can be further obtained in addition to the same effects that can be obtained in the first embodiment.

(1) The dummy patterns 21a, 21b, 22a and 22b are arranged on both sides of the directional couplers 11 and 12 respectively. Therefore, similarly to the first embodiment, the polarization mode coupling can be suppressed in the directional couplers 11 and 12, and the PDL that can be incline by the polarization mode coupling can be thereby reduced.

(2) In the PLC-VOA 10A, the light is extinguished by using an area where the coupling efficiency is between 0 and 100, however, if an extinction ratio is larger (i.e. the coupling efficiency is smaller), the influence of polarization dependency may emerge more easily, and the PDL becomes larger. Therefore, the PLC-VOA 10A is a device in that lower PDL is an important factor. According to the present embodiment, the PLC-VOA 10A with PDL caused by the polarization mode coupling reduced can be achieved.

Figure 8:
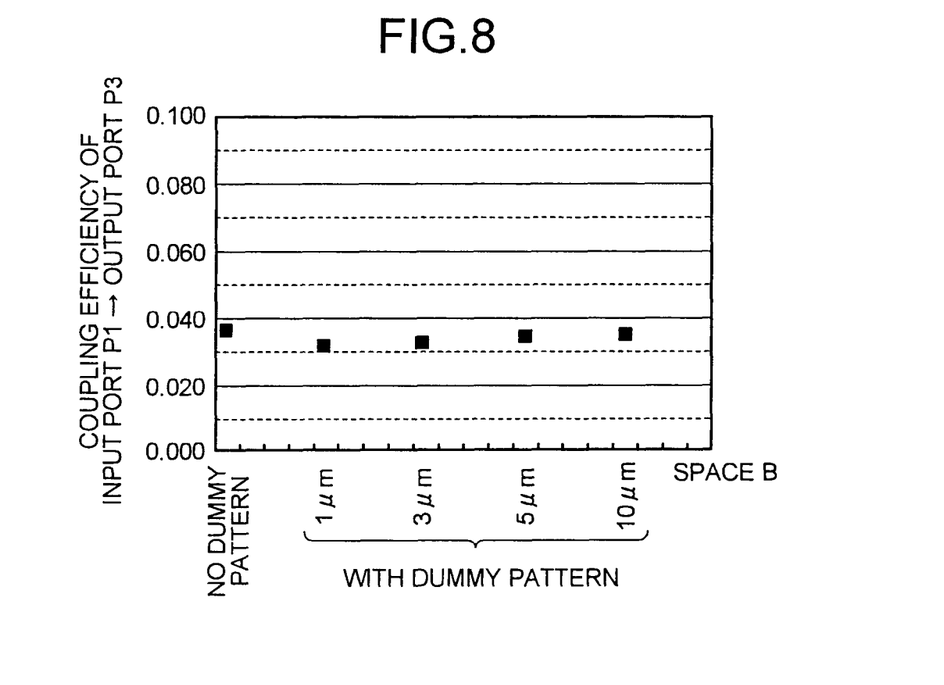
FIG. 8 is a graph representing coupling efficiencies of the waveguide-type optical circuit shown in FIG. 7.
Figure 9:
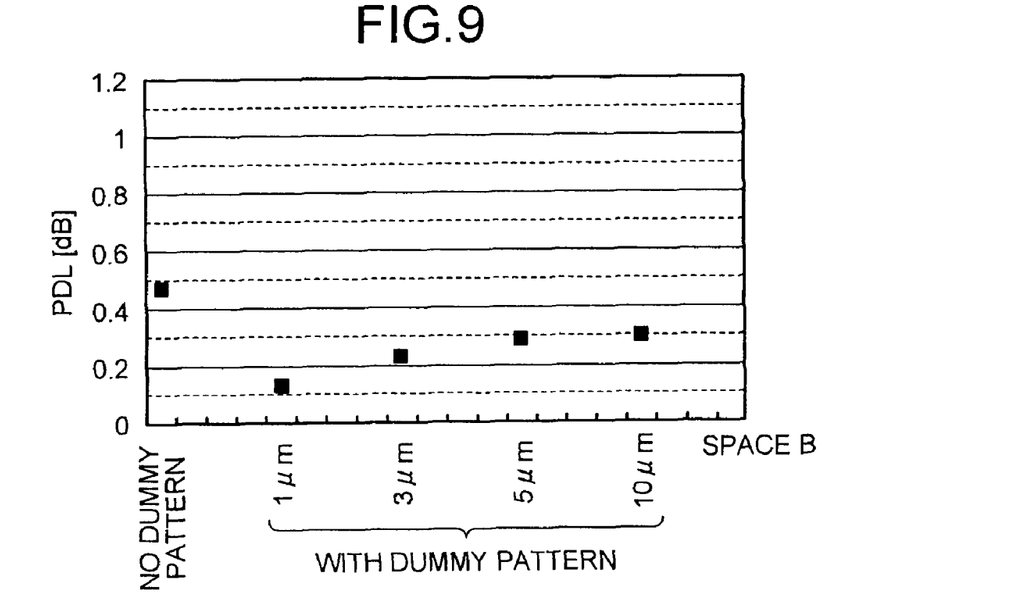
FIG. 9 is a graph representing PDL of the waveguide-type optical circuit shown in FIG. 7.

(3) FIGS. 8, 9 and 10 show measured coupling efficiencies, PDL, and excessive losses. In the PLC-VOA 10A shown in FIG. 7, when the coupling efficiency from the port P1 (input port) to the port P3 (output port) in the MZI circuit 20 is set to about 4%, and in a case where the gap B is set to 1 ($\mu$m) which is equal to the gap size A, or to 3 ($\mu$m), 5 ($\mu$m), or 10 ($\mu$m) which is larger than the gap size A, and a case for comparison where no dummy pattern is provided.

Referring to FIG. 8, when the gap B is set to 1 ($\mu$m), 3 ($\mu$m), 5 ($\mu$m), or 10 ($\mu$m), it may found that the coupling efficiency with the same level as that in the case where there is no dummy pattern may obtained.

Referring to FIG. 9, the PDL is the smallest when the gap B is 1 ($\mu$m), increases in order of the gap B being 1, 3 and 5 ($\mu$m), and the gap B hardly changes when B is 10 ($\mu$m) being greater than 5 ($\mu$m). The PDL is small in all the cases where the gap B is 1, 3, 5, or 10 ($\mu$m) as compared with the case where no dummy pattern is provided. Therefore, by forming the dummy patterns, the PDL becomes smaller, and thus it is obvious that the effect of the present invention can be obtained. Furthermore, in a range of B$\leq$5 ($\mu$m), the PDL is dependent on a gap width and become smaller. When the gap B is set to 1 ($\mu$m) which is equal to the gap size A, the PDL becomes the smallest. In other words, it can be understood that the PDL reduction effect according to the present invention can be obtained when the gap B is set to be equal to the gap size A. Moreover, in a case of B$\geq$5 ($\mu$m), the PDL is nearly the same value as that in the case of B=5 ($\mu$m), the PDL has almost no gap B-dependency, and in addition, the PDL is smaller than in the case of no dummy pattern. More specifically, if the gap B$\geq$5 ($\mu$m) is used, fixed PDL reduction effect can be obtained without being affected by the manufacturing error of the gap B.

Meanwhile, referring to FIG. 10, it can be understood that the excessive loss is high only when B is 1 ($\mu$m). This is because if the dummy patterns 21a, 21b, 22a and 22b are made too close to the waveguide cores of the directional couplers 11 and 12 respectively, small optical coupling occurs thereby. In other words, when B is 1 ($\mu$m), the PDL reduction effect is the highest although an excessive loss occurs. Therefore, by making the gap B larger than the gap size A, for example, by using B=3, 5, or 10 ($\mu$m), the PDL reduction effect can be obtained while suppressing the excessive loss. It should be noted that a coupling loss is included in the excessive loss shown in FIG. 10.

(4) According to the method of manufacturing the PLC-VOA 10A, the method is nearly the same as the conventional method, and therefore the PLC-VOA 10A can be manufactured without needing any additional particular manufacturing process.

The present invention can also be embodied by being modified as follows.

Figure 11:
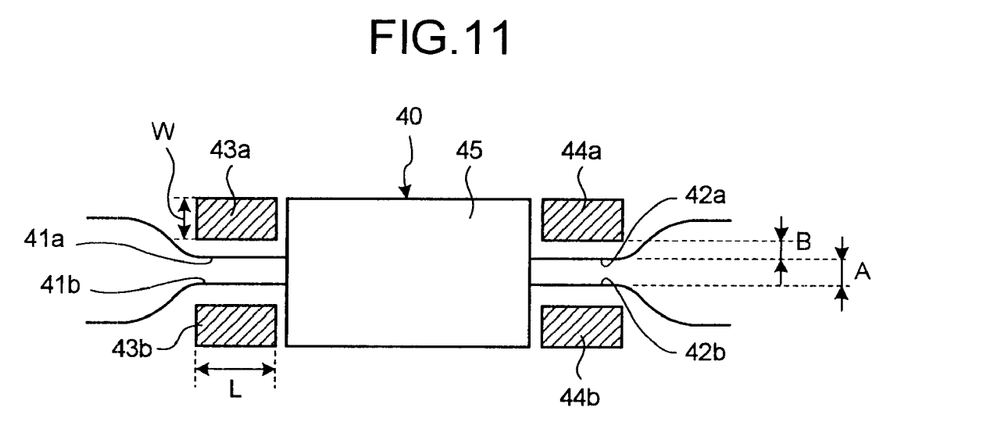
FIG. 11 is a plan view of a modification of the waveguide-type optical circuit shown in FIG. 7.

In the PLC-VOA 10A according to the second embodiment, instead of the directional couplers 11 and 12 explained as one example of the optical coupler (optical branch coupler) in which the waveguide cores are close to each other, the present invention can adopt two MMI couplers 40 as the present invention is also applicable to a waveguide-type optical circuit such as PLC-VOA provided with a plurality of MZI circuits using the two MMI couplers 40. Each MZI circuit is formed of the two MMI couplers 40 and two arm waveguides connected between the two MMI couplers 40. The MMI coupler 40 includes two mutually close waveguide cores 41a and 41b on an input side and two mutually close waveguide cores 42a and 42b on an output side. Dummy patterns 43 and 43 are formed on both sides of the waveguide cores 41a and 41b, and dummy patterns 44 and 44 are formed on both sides of the waveguide cores 42a and 42b, respectively. In FIG. 11, reference numeral "45" represents a slab waveguide for causing multi-mode optical interference to occur.

Figure 12:
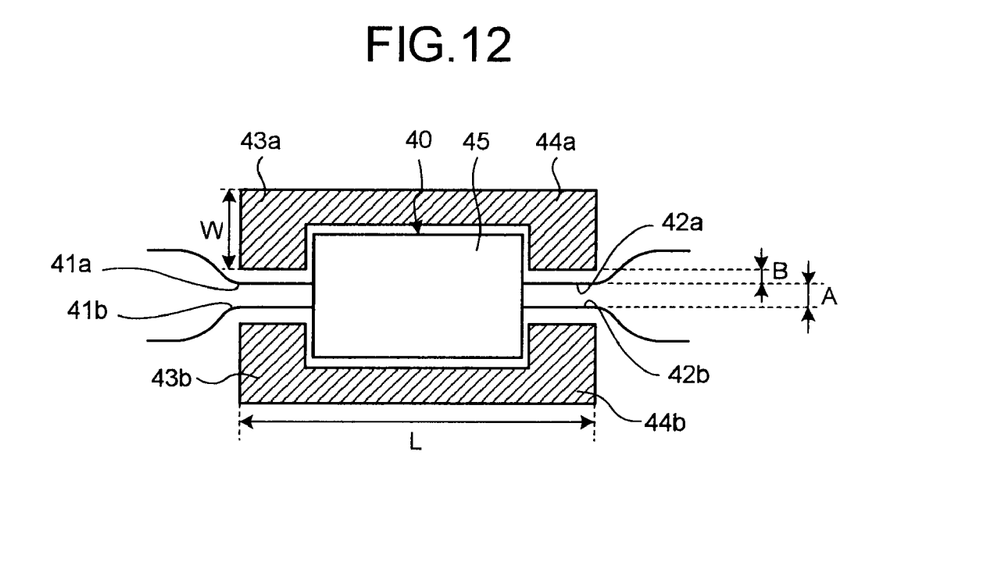
FIG. 12 is a plan view of another modification of the waveguide-type optical circuit shown in FIG. 7.

Furthermore, in the PLC-VOA 10A according to the second embodiment, when the two MMI couplers 40 similar to the ones in FIG. 11 are used instead of the directional couplers 11 and 12 explained as one example of the optical coupler (optical branch coupler) in which the waveguide cores are close to each other, two dummy patterns 46 and 46 may be formed on both sides of the MMI coupler 40 as shown in FIG. 12. Each of the dummy patterns 46 and 46 is formed as one dummy pattern in such a manner that dummy patterns 43 and 44 respectively positioned on the outside of the waveguide cores 41a and 42a and on the outside of the waveguide cores 41b and 42b are connected to each other along the outside of the MMI coupler 40.

In the PLC-VOA 10A according to the second embodiment, the present invention is also applicable to a waveguide-type optical circuit such as a PLC-VOA using an optical coupler (optical branch coupler) including an asymmetric X branch or the like, instead of the directional couplers 11 and 12, in which polarization mode coupling occurs in a region where the waveguide cores are close to each other.

Furthermore, the second embodiment explains the PLC-type variable optical attenuator (PLC-VOA) as one example of the waveguide-type optical circuit. However, the present invention is also applicable to the waveguide-type optical circuit configured as a PLC-type star coupler and as a PLC-type optical coupler such as a PLC-type 2×2 coupler.

Moreover, the present invention is applicable to a delay demodulation device used in an optical transmission system adopting a DQPSK (Differential Quadrature Phase Shift Keying) system in the waveguide-type optical circuit provided with the MZI circuit formed of two optical couplers each having a structure in which waveguide cores are close to each other and of two arm waveguides connected to the two optical couplers. By applying the present invention to the delay demodulation device, similarly to the PLC-VOA 10A, the delay demodulation device with reduced PDL caused by the polarization mode coupling can be achieved.

As explained above, the waveguide-type optical circuit according to the present invention is suitable to be applied to various optical devices used in the optical transmission system or the like.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A waveguide-type optical circuit comprising:
   an optical coupler being an optical branch coupler constructed from waveguide cores which are closely arranged to each other; and
   dummy patterns that lay along sides of the waveguide cores in the optical coupler for preventing optical major axes of the waveguide cores from inclining, wherein
   the optical coupler is a directional coupler,
   a length of the dummy pattern is equal to or greater than a length of a coupling portion, the coupling portion being a region in which a coupling efficiency of the optical coupler is greater than 0%,
   the dummy pattern extends to a region in which the waveguide cores curve so that a gap between the waveguide cores gradually spreads from a portion in which the waveguide cores are most closely arranged to each other, and
   a gap between the dummy pattern and the waveguide core in the optical coupler is equal to or greater than a gap size between the waveguide cores in the optical coupler.

2. The waveguide-type optical circuit according to claim 1, wherein a width of the dummy pattern is equal to or greater than a width that a fundamental mode of a propagation light along a waveguide of the optical coupler will not be coupled to the dummy pattern.

3. The waveguide-type optical circuit according to claim 1, wherein at least one of a gap between the dummy pattern and the waveguide core of the optical coupler, a length of the dummy pattern and a width of the dummy pattern is set so that an amount of polarization mode coupling of the optical coupler becomes −25 dB or less.

4. The waveguide-type optical circuit according to claim 1 further comprising a Mach-Zehnder interferometer circuit having the two optical couplers and two arm waveguides connecting between the two optical couplers.

5. The waveguide-type optical circuit according to claim 1 being a planar lightwave circuit in which over cladding is formed by using a flame hydrolysis deposition method.

6. The waveguide-type optical circuit according to claim 5, wherein the planar lightwave circuit is a PLC-type optical coupler.

7. The waveguide-type optical circuit according to claim 5, wherein the planar lightwave circuit is a PLC-type star coupler.

8. The waveguide-type optical circuit according to claim 5, wherein the planar lightwave circuit is a PLC-type variable optical attenuator that includes
   a Mach-Zehnder Interferometer circuit that is formed of two optical couplers and two arm waveguides connected between the two optical couplers, and
   a thin film heater formed on an upper portion of at least one of the two arm waveguides, and that causes the thin film heater to function as a phase shifter.

9. The waveguide-type optical circuit according to claim 1, wherein the dummy pattern is formed with the same material as that of the waveguide cores.

10. The waveguide-type optical circuit according to claim 1, wherein each of the dummy patterns has a first side and a second side, the first sides close to the waveguide cores being formed so that each of the first sides has a constant gap to the opposite waveguide core, the second sides far from the waveguide cores being formed so that the second sides are parallel to each other.

\* \* \* \* \*